Aug. 18, 1953
R. W. JACK ET AL
2,649,033
DIE CUTTING MACHINE
Filed Aug. 26, 1950
6 Sheets-Sheet 1
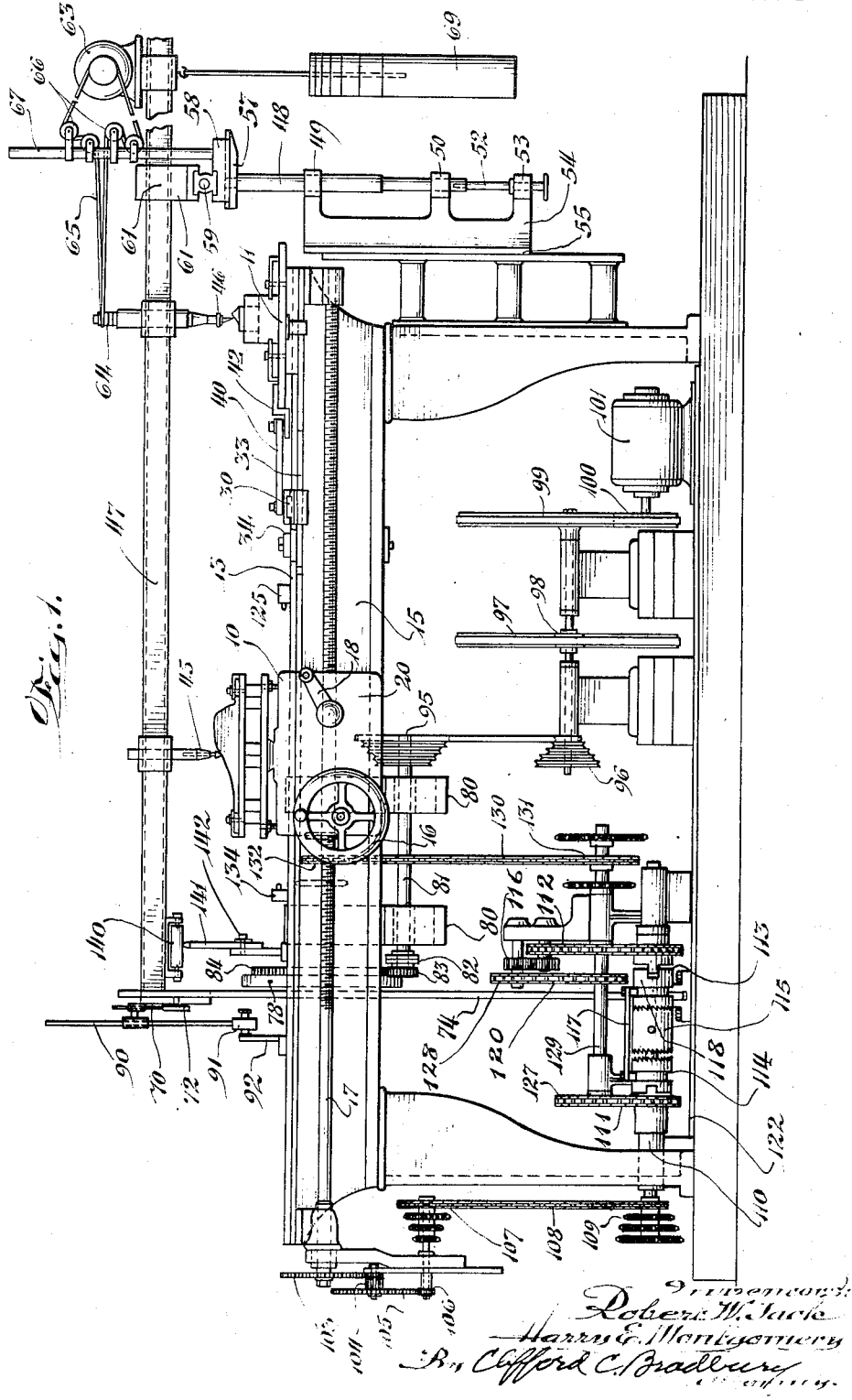

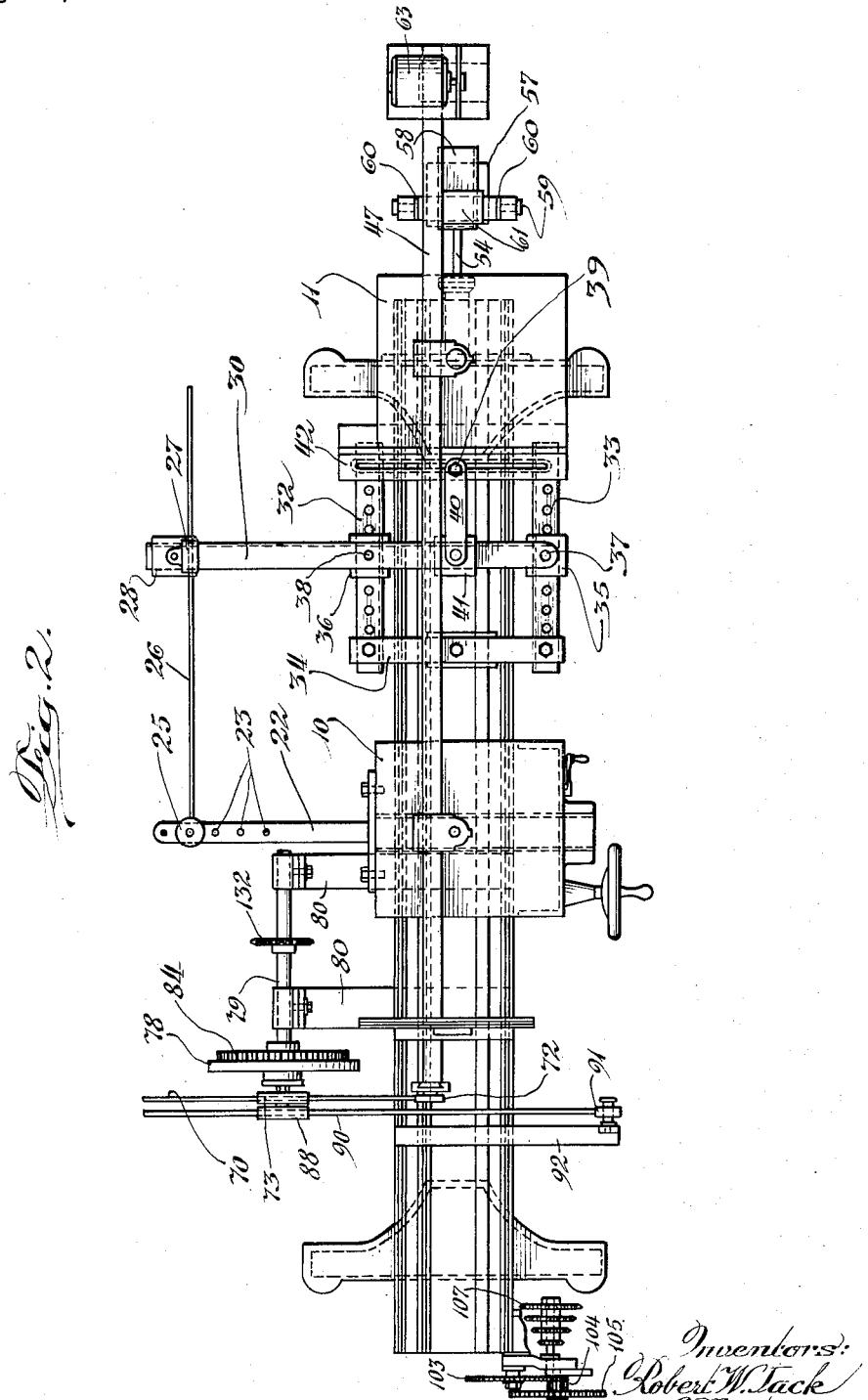

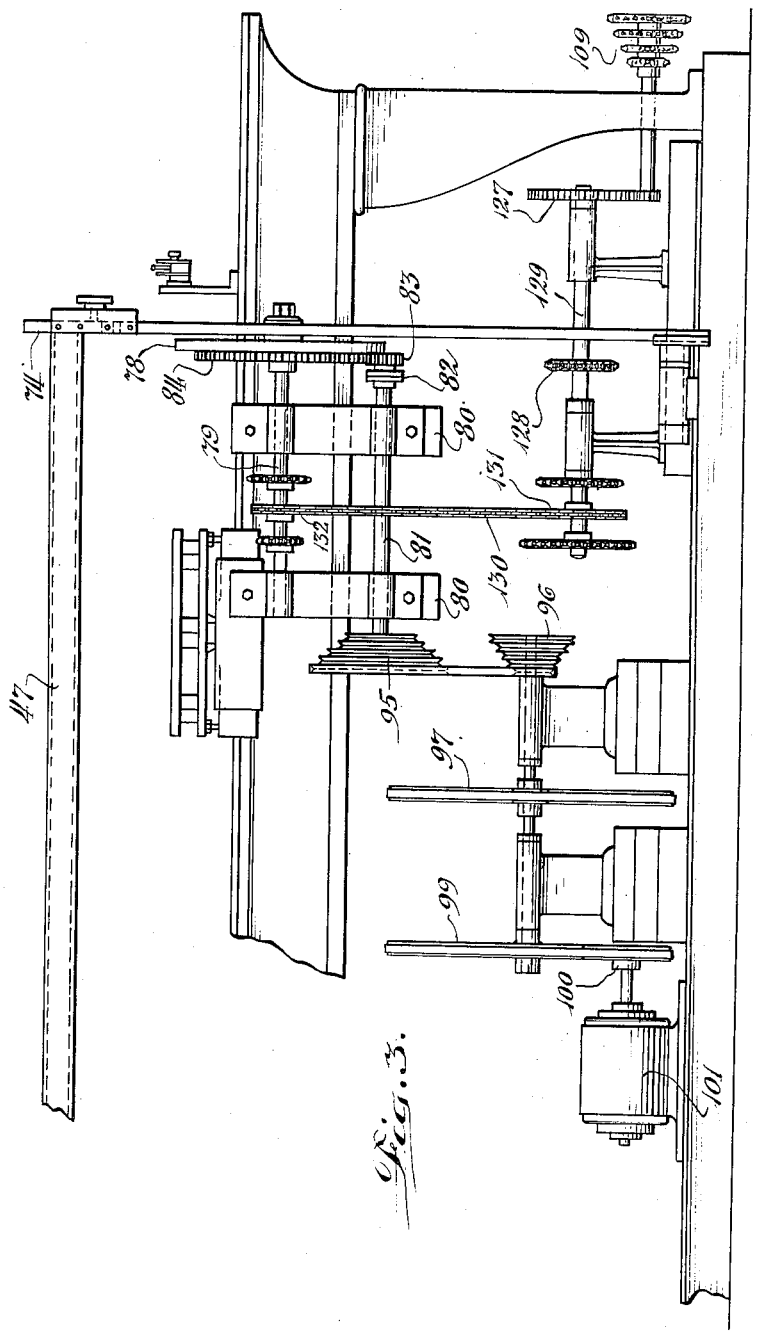

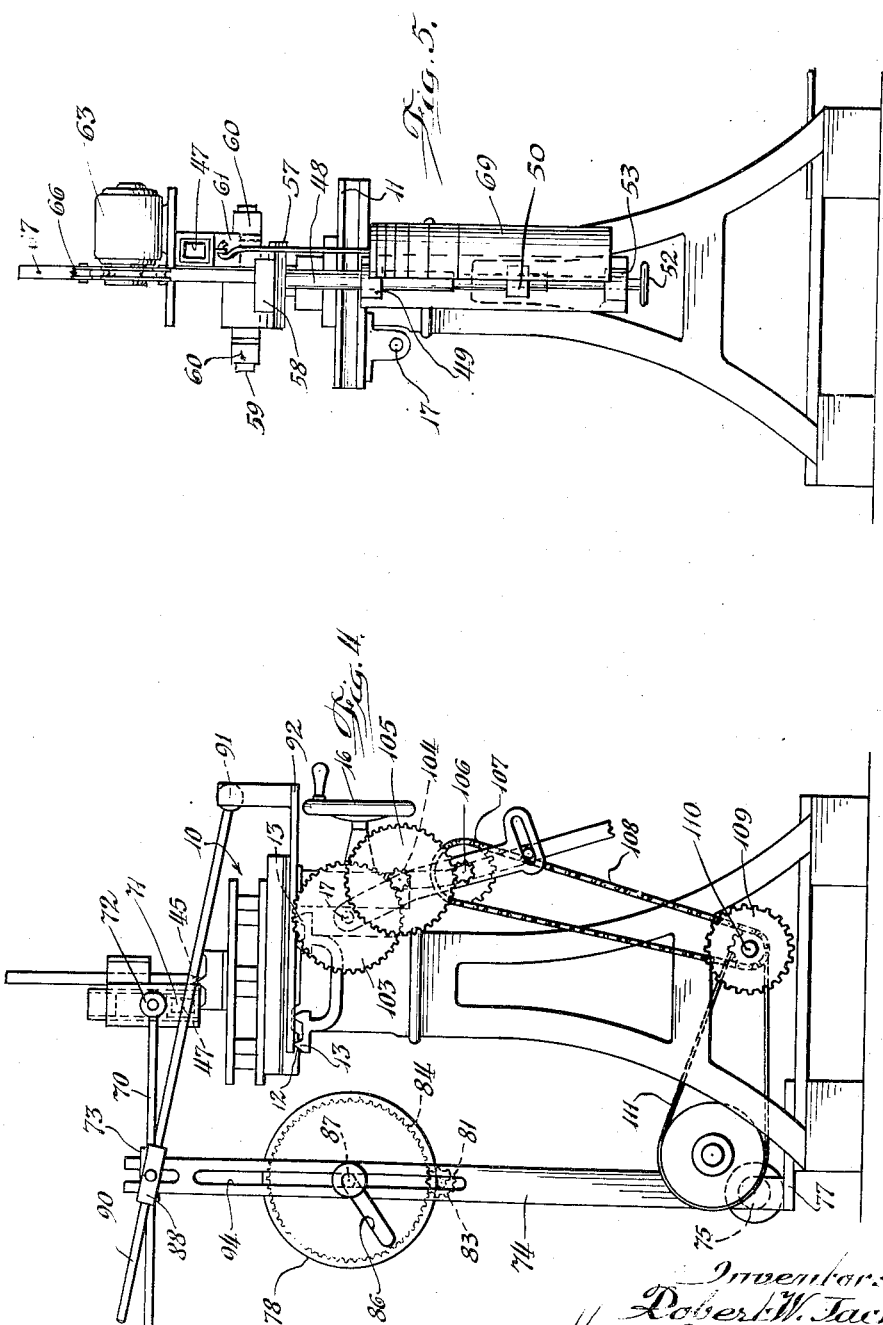

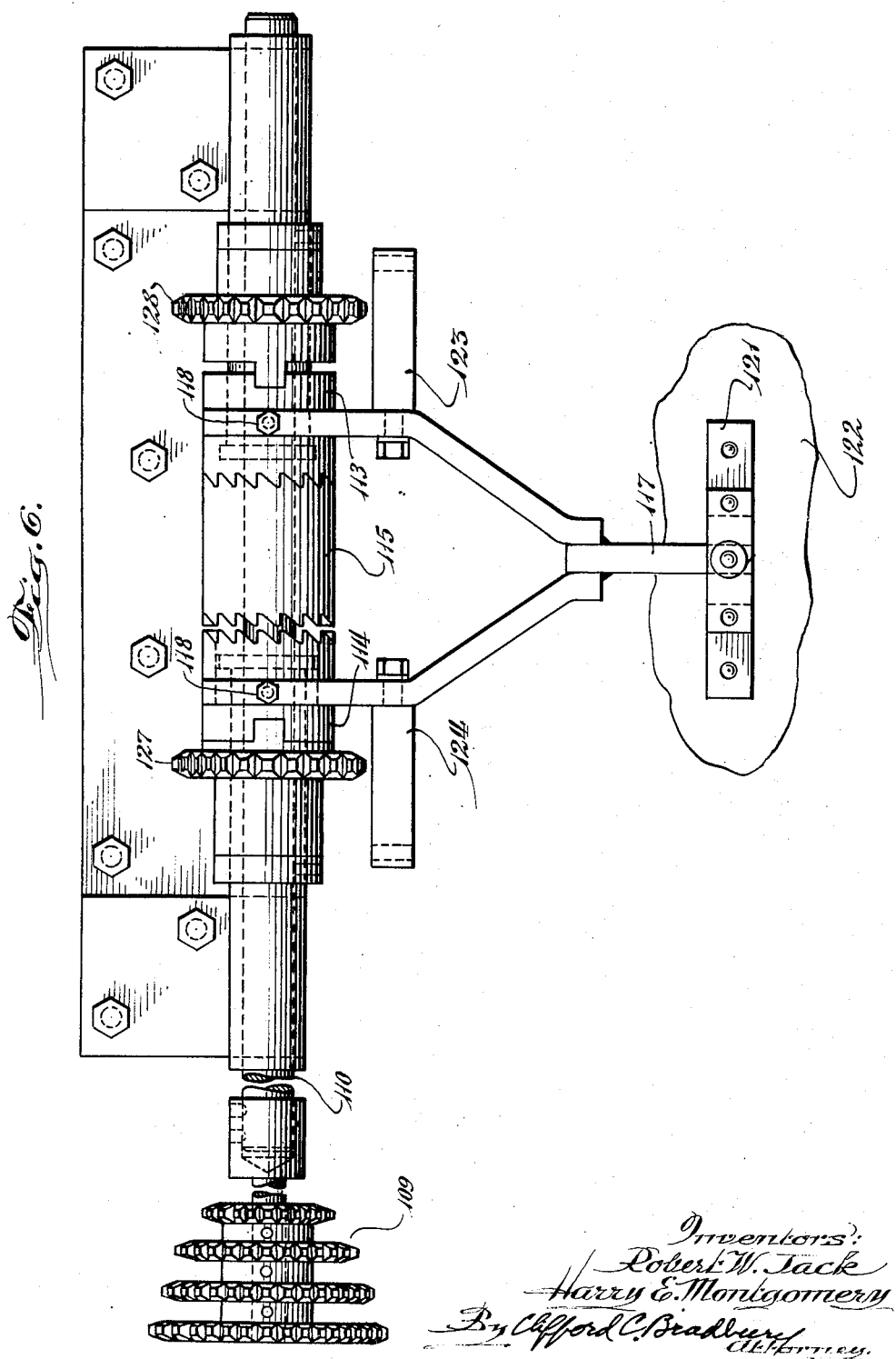

Aug. 18, 1953     R. W. JACK ET AL     2,649,033
DIE CUTTING MACHINE
Filed Aug. 26, 1950     6 Sheets-Sheet 6
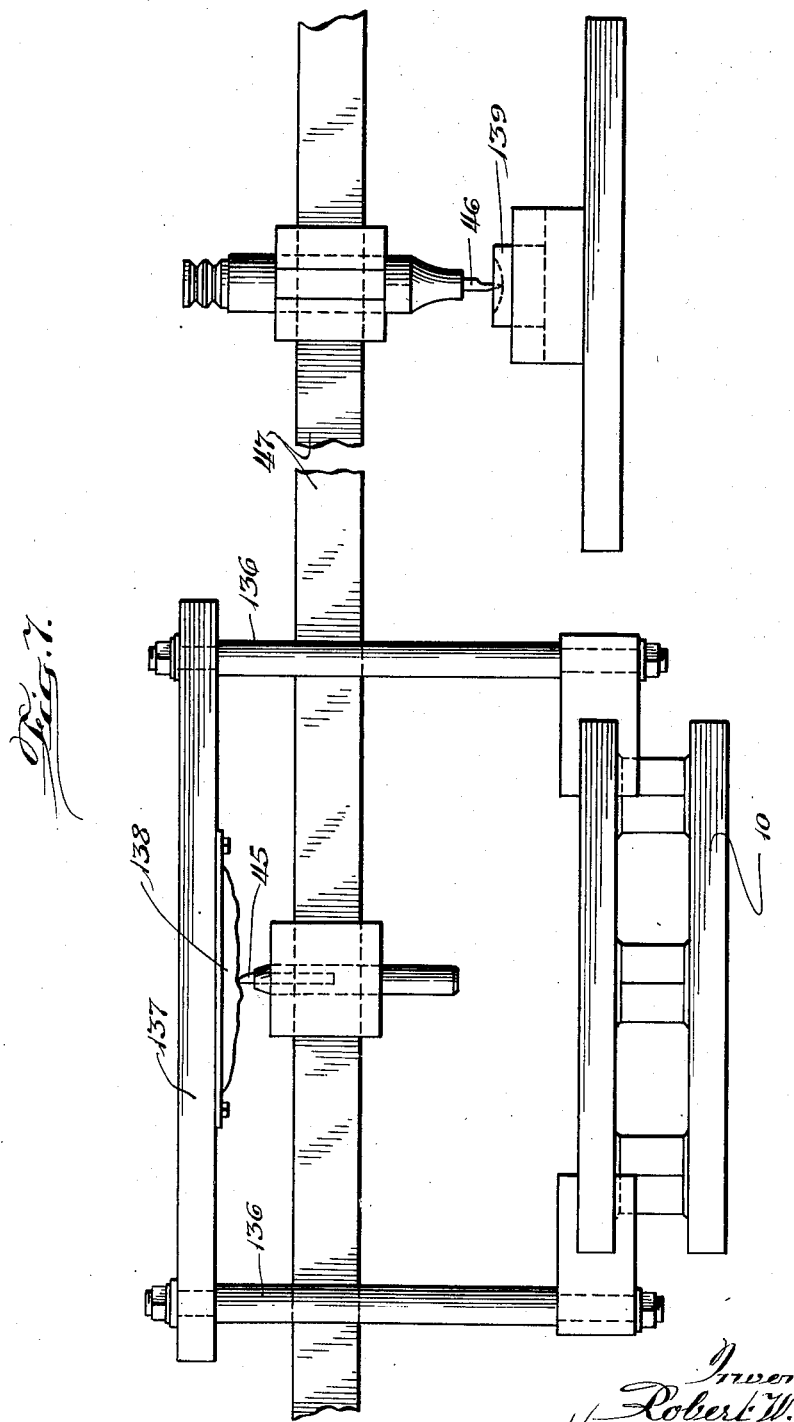

UNITED STATES PATENT OFFICE 2,649,033

DIE CUTTING MACHINE

Robert W. Jack and Harry E. Montgomery, Rochester, N. Y., assignors to Metal Arts Company, Rochester, N. Y., a corporation of New York Application August 26, 1950, Serial No. 181,638

6 Claims. (Cl. 90—13.1)

Our invention relates to machines for cutting or engraving dies or molds from models which may be either in relief or in intaglio form.

In accordance with our invention, a model table and a work table are arranged in horizontal positions on ways which may be those of a lathe bed, provision being made to move the model table and the work table proportionately along the ways. A stylus, or tracer, and a quill, or cutter, are arranged to be moved proportionately across the model and work tables, and proportionately toward and away from the model and work tables so that the quill follows the outline of the model and engraves the work to a contour corresponding in details either directly or in reverse to the details of the model.

One improvement to which our invention relates is the provision for steady uniform horizontal proportionate movements of the model and work tables which are independent of the lateral movements of the stylus and quill.

Another improvement resides in the means for automatically reversing the travels of the model and work tables so that without attention of an operator the stylus and quill can be made to retrace the entire area of the model and work, producing a finish on the work when the quill is making only minute cuttings on the surface of the work.

Another improvement resides in provision for moving the work table in the opposite direction from the movement of the model table so that both right and left-hand work can be produced from a single model.

Another improvement resides in mechanism for reversing the vertical travel of the stylus with respect to the quill so that intaglio engraving of the work can be produced from a model in relief, or an engraving in relief can be produced from a model in intaglia.

Another improvement resides in the provision of an adjustable friction or resistance means for the bar called the "ratio bar" which carries the stylus and quill to insure against vibration or chattering of either the stylus or the quill, the drag or friction being large in relation to the resistance of the stylus so that when the stylus passes from an upgrade to a level portion, or to a downgrade portion of the model, the tendency of the stylus to jump or chatter is entirely eliminated.

Another improvement lies in the arrangement of drive shafts, speed reducing gears and pulleys by which all of the movements of the machine are caused to operate smoothly and without vibration, thus eliminating irregular surfaces on the engraved work.

Still further improvements are set forth in the following detailed description and in the appended claims.

Our invention is illustrated in the accompanying drawings in which like characters designate like parts on the several views, and in which Fig. 1 is a front elevation of our engraving machine showing the model table at the left and the work table at the right.

Fig. 2 is a plan view of our engraving machine.

Fig. 3 is a rear view of the model table end of the machine showing the arrangement of the power drive connections, but from which the power drive for rotating the lead screw to produce horizontal movement along the ways of the machine bed has been omitted.

Fig. 4 is an end elevation showing the left end of the device as illustrated in Fig. 1.

Fig. 5 is an end elevation showing the right end of the device as illustrated in Fig. 1.

Fig. 6 is an enlargement of the reversing mechanism shown in the lower left portion of Fig. 1.

Fig. 7 is an illustration of the model table extension which is used when an intaglio engraving is to be made from a relief model, or conversely, when a relief engraving is to be made from an intaglio model.

Referring more particularly to Figs. 1 to 5, the model table 10 and the work table 11 are provided with V-grooves 12 to fit upon V-ways formed along the top surface of the bed 15. The model table 10 may be moved along its way by turning the hand wheel 16 for the initial adjustment of the model table 10, or by the rotation of the lead screw 17, the switching from hand operation to lead screw operation being controlled by the lever 18 by mechanism beneath the skirt 20, which mechanism is not shown because it is of standard construction such as is used on the tool carriage of machine lathes. The movement of the work table 11 along the ways 13 is brought about by a pantograph structure which receives its moving force from the model table 10, through an adapter bar 22, which is rigidly attached to and extends rearwardly from the model table 10. The adapter bar 22 is provided with a plurality of spaced openings 23 into any one of which a pin or bolt may be inserted for holding the cone member of the ball bearing 25, the ring of which is suitably attached to the connecting rod 26. The connecting rod 26 passes through an opening in a block 27, which is suitably pivoted on a dovetailed connecting rod slide 28, which rides on the pantograph bar 30. Set screws are provided for holding the connecting rod in a selected position in the block 27 and for holding the slide 28 in a selected position on the pantograph bar 30.

Work table locating bars 32 and 33 are rigidly attached to the bed 15 by means of a cross-plate 34 secured across the ways of the bed and extend parallel with and one on each side of the bed. Two locking bar slides 35 and 36 are arranged to be moved lineally of the work table locating bars 33 and 32, respectively, and are provided with trunnions 37 and 38 by which the pantograph bar 30 may be pivotally connected to either the work table locating bar 32 or 33, but as will be hereinafter explained, the bar 30 is never connected to both of the locating bar slides 35 and 36 at the same time.

A link 40 is pivotally connected with a pantograph bar slide 41 and with a slotted bar 42 which is attached to the work table 11. The link 40 may be moved crosswise of the bed to any position between the locating bar slides 35 and 36. This is accomplished by moving the pantograph bar slide 41 along the dovetailed pantograph bar 30 and by moving the work table connecting bar 39 along the slot in the slotted bar 42, keeping the link 40 substantially parallel with the machine bed 15 when the pantograph bar 30 extends at right angles to the bed 15.

The purpose of having two work table locating bars 32 and 33 is to make possible a reversal of movement between the model table 10 and the work table 11. When the pantograph bar 30 is pivoted to the work table locating bar slide 35, the pantograph structure causes the work table 11 to move in the same direction as the movement of the model table 10. When the pantograph bar 30 is pivoted to the locating bar slide 36 and disconnected from the locating bar slide 35, the work table 11 is caused to move proportionately in the opposite direction from the movement of the model table 10. The amount of movement of the work table with respect to the model table is adjusted by moving the link 40 to different positions along the pantograph bar 30 and the slotted bar 42, and by the movement of the connecting rod 26 to different posiitons along the adapter bar 22 and the pantograph bar 30.

A stylus 45 and an engraving quill 46 are each slidably mounted on a square ratio bar 47. The ratio bar 47 is universally pivoted near its righthand end (Fig. 1). The vertical trunnion comprises a shaft 48, supported in bearings 49 and 50, and is movable vertically by an adjusting screw 52 threaded in the lower part 53 of the bracket 54, which also carries the bearings 49 and 50. The adjustable vertical shaft 48 may be raised or lowered in its bearings 49 and 50 by the aid of adjusting screw 52 for major adjustments to accommodate differing heights of models and work. The vertical trunnion 48 is located in substantially the same vertical plane in which the lower ends of the stylus 45 and the quill 46 are located.

A block 57 provided with dovetailed ways is mounted upon the upper end of the trunnion shaft 48, and carries a slide 58 which is adjustable on the block 57 lengthwise of the bed 15. The slide 58 carries a pair of horizontally positioned pivot supports into which cone pointed screws 59 are threaded to support the cone cups 60 in the ratio bar support 61. The pivots 59 are located in substantially the same horizontal plane in which the tips of the stylus and quill are located.

A motor 63 is mounted upon the overhanging end of the ratio bar 47 for rotating the quill shaft 64 by means of a small round belt 65 which passes over a series of adjustable idler pulleys 66, mounted on a rod 67, which extends upwardly from and is supported by the slide 58. The supports for the pulleys 66 may be moved vertically along the rod 67 and fastened in the proper positions to maintain a proper tension on the round belt 65 and to permit the quill 46 to be moved to various positions along the ratio bar 47. A weight 69 is attached to the protruding end of the ratio bar 47 and is adjusted to almost, but not quite, overbalance the ratio bar 47 about its horizontal pivots 59.

It will be seen from the foregoing description that the horizontal and vertical movements of the stylus 45 will be proportionately duplicated by the point of the quill 46. The vertical movement of the stylus 45 responds to the conformation of the model upon which the stylus lightly rests.

The horizontal movement of the stylus 45 and the consequent horizontal movement of the quill 46 is brought about by mechanism more clearly illustrated in Figs. 2 and 4.

A stroke centralizing bar 70 is pivotally connected to the adjustable ratio bar carrier 71 by a universal ball bearing pivot structure 72, and is lineally adjustably secured in the block 73, which is pivotally and adjustably secured to the upper end of the oscillating bar 74. The lower end of the oscillating bar 74 is pivotally supported at 75 on the base 77. The bar 74 is oscillated by the rotation of a stroke regulator disc 78, the shaft 79 of which is rotatably supported on brackets 80 extending laterally from the underside of the bed 15. The brackets 80 also carry the bearings for the shaft 81 on which a pair of shear pin discs are mounted which carry and normally drive a pinion 83, which meshes with the gear 84, attached to the stroke regulator disc 78. The stroke regulator disc is provided with a slot 86 in which a guide pin 87 is adjustably secured. This pin 87 is illustrated in Fig. 4 at the center of the stroke regulator disc 78 but is adapted to be fixed to the disc 78 at any position along the slot 86 for the purpose of regulating the stroke or oscillation of the bar 74 as the disc 78 is rotated. The rotation of the disc 78 is accomplished through the rotation of the pinion 83 mounted as before described.

The upper end of the oscillating bar carries a second pivoted block 88. A friction bar 90 extends through an opening in the block 88 and has its remote end pivotally attached at 91 to the bed 15 by means of a bracket 92.

In order to adjust the stylus for its proper horizontal movement, it is first positioned at the horizontal center of the model, and with the slot 86 in the disc 78 standing vertically, the block 73 is tightened upon the centralizing bar 70. Next, the disc 78 is rotated until its slot 86 extends horizontally. The upper end of the oscillating bar 74 is then moved laterally of the bed 15 until the stylus 45 reaches the extreme lateral position on the model. At this time the guide pin 87 is tightened, binding it in the slot 86. It will thus be seen that the rotation of the stroke regulator disc 78 causes the guide pin 87 to move up and down in the slot 94 in the oscillating bar to cause the stylus to move laterally from one extreme to the other of the model.

The purpose of the friction bar 90 is to dampen all vibration as the centralizing bar moves the stylus back and forth across the varying contour of the model. The lateral movement of the stylus is very slow, the pinion gear being driven through reduction cone pulleys 95 and 96 and V-belt pulleys 97, 98, 99 and 100 by the motor 101.

Although as stated, the lateral movements of the stylus and quill are very slow, the movements of the model table and the work table along the ways of the bed 15 are very much slower than the lateral movements of the stylus and quill. The slow lineal motion of the model table responds to the slow rotation of the lead screw 17. The left end of the lead screw (Fig. 1) carries a gear wheel 103, driven by a pinion 104, attached to a gear wheel 105, which is driven by a pinion 106. A chain sprocket 107 is mounted on the shaft which carries the pinion 106, and is driven through a chain 108 and sprocket 109 mounted upon a reversing clutch shaft 110, which is driven by chains 111 and 112, the chain 112 being driven through meshing gears 116 to reverse the direction of rotation to cause the right end part 113 of the clutch on the shaft 110 to rotate oppositely from the left end part 114 of the clutch (Fig. 6). The central member 115 of the clutch is pinned to the shaft 110 so that the shaft is caused to rotate either clockwise or counter-clockwise, depending upon the positions of the clutch members 113 and 114.

A yoke 117 is provided with pins 118 which engage in circumferential grooves in the clutch members 113 and 114 to shift them simultaneously along the shaft 110.

The yoke 117 slides bodily along the shaft 110 and in the guide 121 secured to the base 122, moving the clutch members 113 and 114 to their alternate positions. The yoke 117 is moved from one position to the other by means of a pair of solenoids 123 and 124, the circuits for which are controlled by a so-called "limit switch" 125, which is attached to the bed 15 in position to be actuated by pressure from the model table when it has moved to a position in which the stylus 45 has arrived at its extreme position after one complete traverse of the model.

When the switch 125 is actuated, it changes the electric circuit from one of the solenoids 123—124 to the other through a suitable source of current, thus reversing the direction of rotation of the lead screw 17 and, consequently, the direction of movements of the model table 10 and work table 11.

The chain sprockets 127 and 128, which drive the clutch members 113 and 114 in opposite directions of rotation, are mounted one upon a shaft 129 and the other on the shaft of one of the meshing gears 116. The shaft 129 is driven by means of a chain 130 and sprocket 131 from a sprocket 132 which is mounted upon the shaft 79. One of the meshing gears 116 is driven by a chain 120 from the shaft 129. A switch 134 controls a pair of electrical circuit breaking contacts in the circuit of the main motor 101. The switch 134 may be attached to the bed 15 either in the position shown or in the position in which the switch 125 is illustrated. If located in the position shown in Fig. 1, the circuit of the main motor will be interrupted when the model table has moved to the right, and then back to the left to the position of start. If the switch 134 is located in the position in which the switch 125 is illustrated in Fig. 1, then the motor 101 will be stopped when the model table has moved to the right a sufficient distance for the stylus to have traversed the entire model.

An extension to the model table by means of which the model may be reversed is illustrated in Fig. 7. In accordance with this feature of our invention, four standards 136 support a plate 137 above the normal level of the model table 10. The model 138 to be copied is attached to the lower face of the plate 137, and the stylus 45 is reversed so that it now extends upwardly instead of downwardly into contact with the model 138. The quill will, therefore, engrave an intaglio 139 of the model. When the arrangement of Fig. 7 is used, the weight 69 is slightly increased so that the ratio bar 47 will be slightly overbalanced.

Summarizing the setting up and operation of our die cutting machine, the pantograph structure is first adjusted to provide the proper ratio between the size of the model and the size of the die to be cut. At the same time the positions of the stylus 45 and the quill 46 are adjusted along the ratio bar 47 to the same ratio of movement as has been adjusted into the pantograph. If it is desired to change the lineal and lateral proportions of the die from those of the model, the settings of the stylus and quill on the ratio bar 47 may be different from the ratio proportions set into the pantograph. If the position of the trunnion block 58 on the dovetailed slide 59 is to the left of the center of the shaft 48, the die will be cut proportionately shallower in relief that the model. If the position of the trunnion block 58 on the dovetailed slide 57 is to the right of the center of the shaft 48, the die will be cut proportionately deeper than the model. If an exact proportion reproduction is desired, the trunnion center must be on the center of the shaft 48. The model and die block are now securely fastened to the model table and work table, respectively, and the model table is moved lineally along its ways by the hand wheel 16 until the stylus 45 is directly above the center of the model. At this time the ratio bar 47 is held against downward movement by a roller 140, which rests upon an adjustable horizontal track 141, which is moved down during the engraving operation by loosening the bolt 142. The die block is now adjusted so that the quill 46 stands immediately above the center of the portion of the die block which is to be engraved. With the roller 140 resting upon the track 141, and the slot 86 in its vertical position, the stroke centralizing bar is secured in its block, the guide pin 87 (Fig. 4) is loosened, and with the slot 86 now moved to a horizontal position, the stylus is moved to one edge of the model. The guide pin 87 is then tightened in the slot 86. These adjustments having been made, the track 141 is lowered and the stylus is lowered onto the model. The quill is now adjusted vertically so that it assumes a position with respect to the die block corresponding to that of the stylus. If the point on the model at which the stylus starts its tracing is lower than the normal surface of the die block, then the quill 46, which is now rotating, must be gradually depressed by hand until it has cut its way into the die block to a depth corresponding with the low point at which the stylus starts tracing the model.

Upon starting of the motor 101, the stylus 45 commences a very slow lateral movement across the model, and, at the same time, the quill 46 starts a proportionate lateral movement across the die block. The rotation of the lead screw 17 causes the model table to move extremely slowly but steadily along the ways of the bed 15 and through the pantograph connection causes a proportionate lineal movement of the work table and die block. This lineal movement is so slow that the stylus moves completely across the model and back to the starting point while the model table moves only a very small fraction of an inch, and since the ratio between the model and the die block is frequently as much as ten to one, the movement of the work table along its ways is so small as to be almost imperceptible for one passage of the quill over and back across the die block. The movement of the work table along its ways is usually less than $1/100$ of an inch for each traverse of the quill.

Although we have shown and described our invention with respect to many details, it is to be understood that we do not wish to be unduly limited thereto, many modifications being possible without departing from the spirit or scope of our invention.

We claim:

1. In an automatic engraving machine, a model table for supporting a model to be copied and a work table for supporting a body to be carved, ways along which said model and work tables may move, means for moving the model table at a uniform speed along said ways for a distance as great as the length of the model, means for moving the work table at a uniform speed proportionate in speed and distance to the movement of the model table, a ratio bar extending above the model and work tables universally trunnioned at one end, a stylus and a cutting tool carried by said ratio bar, means to impart to said ratio bar lateral harmonic motion across the model and work tables, and means to impart vertical movement to said bar corresponding to the contour of the model to be copied.

2. In an automatic engraving machine, model and work tables, means for imparting uniform continuous proportionate movements in the same direction to said tables, for distances equal to the lengths of the model and work, respectively a stylus and a tool in cooperative relation with said model and work tables respectively, and means to move said stylus and tool proportionately across said tables in harmonic motion and proportionately toward and away from said tables.

3. In an automatic engraving machine, model and work tables, means for imparting uniform continuous proportionate movements to said tables in the same direction equal to the lengths of the tables, respectively, a ratio bar, means to move said ratio bar across the tables in harmonic motion in a direction at substantially right angles to the movement of the tables, a stylus and an engraving tool carried by said ratio bar, and a friction member resisting the movement of said ratio bar to prevent its vibration and uneven movement due to changes in resistance to movement of either the stylus or the engraving tool.

4. In an automatic engraving machine, model and work tables, straight parallel ways upon which said model and work tables may move horizontally, a rotatable screw for moving the model table along the ways, power means for rotating the screw steadily and continuously to move the model table from one extreme position to the other, a pantograph connected between the model table and the work table for moving the work table proportionately along the ways, a stylus harmonically and automatically movable across the model table, automatic means for reversing the direction of rotation of the screw when the stylus has traced a predetermined area on said model table whereby the movement of the model table causes the stylus to retrace the said predetermined area, and automatic means for stopping the rotation of the screw when the stylus has retraced the said predetermined area of the model table.

5. In an engraving machine, a model table and a work table, a ratio bar trunnioned near one end and positioned over the model and work tables, power means for harmonically reciprocating the ratio bar across the model and work tables and for moving the model and work tables steadily at right angles to the movement of the ratio bar, and automatically operated means for reversing the direction of operation of the power means when the work table has reached a predetermined position in its movement so that the ratio bar and the model and work tables will retrace their movements.

6. In an engraving machine, a model table and a work table, a ratio bar trunnioned near one end and positioned over the model and work tables, power means for harmonically reciprocating the ratio bar across the model and work tables and for moving the model and work tables steadily at right angles to the movement of the ratio bar, and automatically operated means for reversing the direction of operation of the power means when the work table has reached a predetermined position in its movement so that the ratio bar and the model and work tables will retrace their movements, and automatic means to stop the power means when the movements of the model and work tables have returned to their initial positions.

ROBERT W. JACK.
HARRY E. MONTGOMERY.

References Cited in the file of this patent

UNITED STATES PATENTS

| Number | Name | Date |
|---|---|---|
| 30,922 | Holcomb | Dec. 18, 1860 |
| 82,430 | Merrill | Sept. 22, 1868 |
| 132,594 | Minter | Oct. 29, 1872 |
| 912,240 | Hansen | Feb. 9, 1909 |
| 1,313,543 | Keller | Aug. 19, 1919 |
| 1,351,211 | Keller | Aug. 31, 1920 |
| 1,421,324 | Waitch | June 27, 1922 |
| 1,489,044 | Renken | Apr. 1, 1924 |
| 1,589,933 | Bontempi | June 22, 1926 |
| 2,067,962 | Zwick | Jan. 19, 1937 |
| 2,069,189 | Taylor | Jan. 26, 1937 |
| 2,161,709 | Henkes | June 6, 1939 |
| 2,332,511 | Glassman | Oct. 26, 1943 |
| 2,348,632 | Klema | May 9, 1944 |

FOREIGN PATENTS

| Number | Country | Date |
|---|---|---|
| 418,135 | Great Britain | Apr. 18, 1933 |
| 443,898 | Germany | May 9, 1927 |